Dec. 29, 1925.  1,567,217

H. WEICHSEL

DYNAMO ELECTRIC MACHINE

Filed March 22, 1924

INVENTOR
Hans Weichsel
BY
ATTORNEY

Patented Dec. 29, 1925.

1,567,217

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

DYNAMO-ELECTRIC MACHINE.

Application filed March 22, 1924. Serial No. 701,035.

*To all whom it may concern:*

Be it known that I, HANS WEICHSEL, a citizen of the United States of America, residing at the city of St. Louis, State of Missouri, United States of America, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to dynamo electric machines and particularly to self-excited synchronous motors, self-excited compensated asynchronous motors and converters, whether of the polyphase or single phase type. In such machines it is desirable that the exciting voltage be low in order that too high a voltage will not exist between commutator segments and in the exciting winding during the starting operation. In the larger machines (approximately 25 H. P. and greater) the placing of the inducing winding and the commuted winding in the same slot will, when these windings are of the usual type and pitch, result in too high a voltage between adjacent commutator segments, because in such a machine there may be, for example, a pressure of 5 volts induced in one turn of a rotor coil, and if the proper exciting voltage for normal operation is 15 volts then only three rotor coils in series could be used, which would mean that a machine of the kind referred to would have only three commutator segments per pole. Such a machine would have unsatisfactory commutation.

The object of my invention is to make it possible to increase the number of commutator segments for a given voltage to such an extent that sparkless operation of the machine at starting and at all loads can be secured. This object I accomplish by the location and relation of windings hereinafter described.

Figure 1:
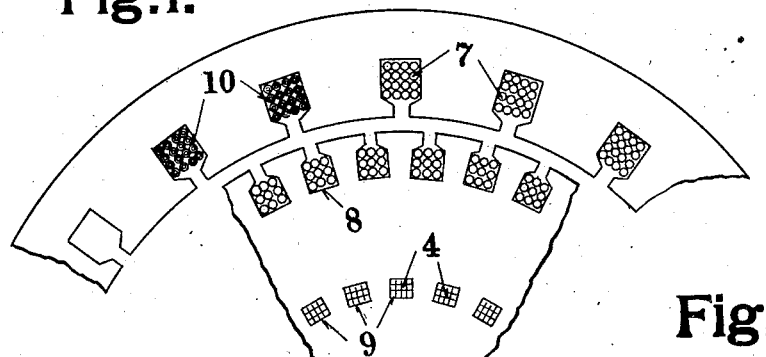
Figure 2:
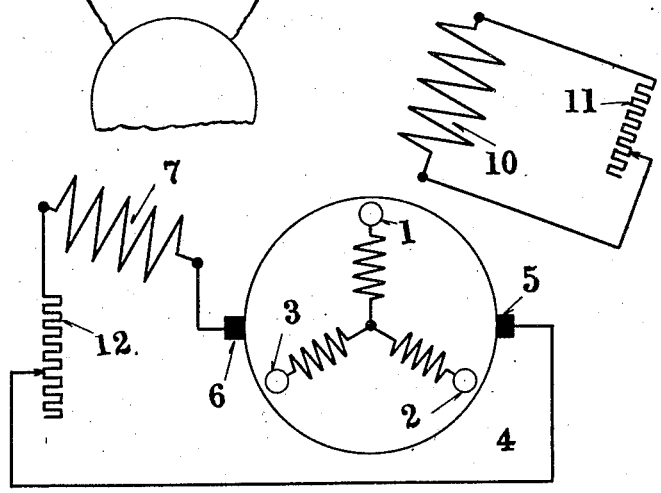
Figure 3:
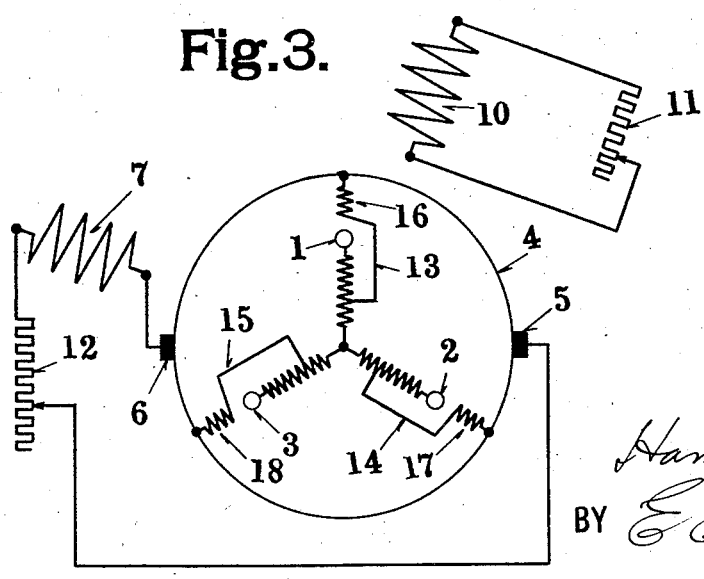

In the accompanying drawings Figure 1 illustrates rotor and stator laminæ of a machine embodying my invention and the location of the windings therein; Figure 2 is a circuit diagram of a motor embodying my invention; and Figure 3 shows a modification of the machine of Figure 2 with respect to the rotor winding.

Referring first to Figures 1 and 2, the rotor is provided with a polyphase winding supplied with line current through slip-rings 1, 2 and 3. The rotor is also provided with a commuted winding 4 which, through brushes 5 and 6 supplies E. M. F. to the exciting winding 7 on the stator which, in the machine illustrated, is the induced member. It will be understood that in synchronous operation this exciting E. M. F. is unidirectional and in asynchronous operation is an alternating E. M. F. of relatively low frequency. The polyphase winding on the inducing member is located in peripheral slots 8 on the rotor, and the commuted winding 4 is located in embedded slots 9 whereby the polyphase inducing winding and the commuted winding 4 are separated by means forming a path which permits a portion of the flux set up by the inducing winding to pass through the rotor without linking with the commuted winding 4. By this means it is possible to control the relation between the voltage impressed on the inducing winding and the voltage inductively impressed by said winding on the commuted winding, since this relation will vary with the degree of separation of the slots carrying these windings.

As indicated in Figure 2 the stator is provided with a starting winding 10, preferably displaced 90 electrical degrees from the exciting winding 7. To start the machine adjustable resistance 12 is included in the exciting circuit, and the winding 10 is closed on itself through adjustable resistance 11. In normal operation the resistances 11 and 12 may be cut out and the winding 10 may be open circuited. However, in a machine designed to operate as a synchronous motor, it is preferable that this winding 10 be short-circuited during normal running condition in order that the machine may continue to operate satisfactorily as an induction motor if the load should increase sufficiently to pull it out of synchronism. As indicated in Figure 2 the exciting winding 7 should, in a synchronous motor, have its axis located either in the axis of the brushes, or at a small angle thereto in order that the machine may have high synchronizing torque.

In a machine as above described the relation between the voltage impressed on the inducing winding through the slip-rings 1, 2 and 3 and the voltage induced in the commuted winding will be determined by the relation between the magnetic resistance of the flux path between the windings and the resistance of paths which would cause magnetic lines to link with the commuted winding. In view of the difficulty of exactly predetermining the position of the commuted winding slots to produce exactly the desired relation between line voltage and the voltage on the commutator, and in order to be able to change this relation as desired, I prefer to conductively impress a definite portion of the line voltage upon the commuted winding. This may be done in the manner indicated in Figure 3 where a percentage of the line voltage is supplied to the commuted winding by means of conductors 13, 14 and 15 connected to taps on the polyphase inducing winding. In this manner a desired portion of the line voltage is impressed upon the commuted winding. In case, however, the voltage desired to be impressed on the commuted winding is greater than that which would be derived by tapping the inducing winding at one available point (the end of a turn) and less than would be derived by tapping said winding at the next available point (the end of the next turn), the exact desired voltage can be obtained by the inclusion of suitably proportioned windings 16, 17 and 18 in circuit between the inducing winding and the commuted winding. These windings 16, 17 and 18 when employed would preferably be placed in slots 4 which carry the commuted winding.

Having fully described my invention, what I claim as new and desire to secure by Letters Patent of the United States is:

1. In an alternating current motor, the combination of an induced member, an inducing member provided with an inducing winding and a commuted winding having its conductors located further from the periphery of the inducing member than the conductors of the inducing winding and separated from said last mentioned conductors by means forming a path permitting a portion of the flux through the inducing member to link with the inducing winding without linking with the commuted winding, said commuted winding being in circuit with a winding on the induced member.

2. In an alternating current motor, the combination of an induced member, an inducing member provided with an inducing winding and a commuted winding having its conductors located further from the periphery of the inducing member than the conductors of the inducing winding and separated from said last mentioned conductors by means forming a path permitting a portion of the flux through the inducing member to link with the inducing winding without linking with the commuted winding.

3. In an alternating current motor, the combination of an induced member, an inducing member provided with peripheral winding slots and with slots positioned within the periphery of said member, an inducing winding in the peripheral slots, and a commuted winding in the second mentioned slots and in circuit with a winding on the induced member.

4. In an alternating current motor, the combination of an induced member, an inducing member provided with peripheral winding slots and with slots positioned within the periphery of said member, an inducing winding in the peripheral slots, a commuted winding in the second mentioned slots and in circuit with a winding on the induced member, and means for conductively impressing on the commuted winding an alternating current E. M. F. derived from the inducing winding.

5. In an alternating current motor, the combination of an induced member, an inducing member provided with peripheral winding slots and with slots positioned within the periphery of said member, an inducing winding in the peripheral slots, a commuted winding in the second mentioned slots and in circuit with a winding on the induced member, and means for conductively impressing on the commuted winding an alternating current E. M. F. proportional to the E. M. F. impressed on the inducing winding.

6. In an alternating current motor, the combination of an induced member, an inducing member provided with peripheral winding slots and with slots positioned within the periphery of said member, an inducing winding in the peripheral slots, a commuted winding in the second mentioned slots and in circuit with a winding on the induced member, auxiliary windings on the inducing member, and means for conductively impressing on the commuted winding an alternating current E. M. F. derived from the inducing winding, said means comprising connections including the auxiliary windings.

7. In an alternating current motor, the combination of an induced member, and an inducing member provided with an inducing winding and with a commuted winding, the conductors of the commuted winding being so located as to embrace a portion only of the total magnetic flux passing through the inducing member and being positioned further from the periphery of the inducing member than the conductors of the inducing winding.

8. In an alternating current motor, the combination of an induced member, and an inducing member provided with an inducing winding and with a commuted winding, said commuted winding being in circuit with the induced member and the conductors of the commuted winding being so located as to embrace a portion only of the total magnetic flux passing through the inducing member and being positioned further from the periphery of the inducing member than the conductors of the inducing winding.

In testimony whereof, I have hereunto set my hand this the 14th day of March, 1924.

HANS WEICHSEL.